US010116710B2

(12) United States Patent
Wirola et al.

(10) Patent No.: US 10,116,710 B2
(45) Date of Patent: *Oct. 30, 2018

(54) SESSION PARAMETERS IN THE PERIODIC ASSISTANCE DATA DELIVERY

(71) Applicant: Nokia Technologies Oy, Espoo (FI)

(72) Inventors: Lauri Wirola, Tampere (FI); Ismo Halivaara, Tampere (FI)

(73) Assignee: Nokia Technologies Oy, Espoo (FI)

( * ) Notice: Subject to any disclaimer, the term of this patent is extended or adjusted under 35 U.S.C. 154(b) by 52 days.

This patent is subject to a terminal disclaimer.

(21) Appl. No.: 15/289,458

(22) Filed: Oct. 10, 2016

(65) Prior Publication Data

US 2017/0034221 A1    Feb. 2, 2017

Related U.S. Application Data

(63) Continuation of application No. 13/640,138, filed as application No. PCT/FI2011/050307 on Apr. 11, 2011.

(Continued)

(51) Int. Cl.
*G06F 15/16*       (2006.01)
*H04L 29/06*       (2006.01)
(Continued)

(52) U.S. Cl.
CPC .......... *H04L 65/1066* (2013.01); *G01S 19/05* (2013.01); *H04W 4/20* (2013.01)

(58) Field of Classification Search
CPC ....... H04L 65/1066; G01S 19/05; H04W 4/20
(Continued)

(56) References Cited

U.S. PATENT DOCUMENTS

2005/0068229 A1    3/2005  Moilanen et al.
2007/0182547 A1*   8/2007  Wachter ................. H04W 4/02
                                                340/539.13
(Continued)

FOREIGN PATENT DOCUMENTS

CN        101375616 A      2/2009
CN        101494831 A      7/2009
(Continued)

OTHER PUBLICATIONS

Office Action from corresponding Indian Patent Application No. 8987/CHENP/2012, dated Nov. 30, 2017, 6 pages.
(Continued)

*Primary Examiner* — David Lazaro
*Assistant Examiner* — Zi Ye
(74) *Attorney, Agent, or Firm* — Alston & Bird LLP

(57) ABSTRACT

Session parameters and/or information regarding session parameters are provided to a target device from a location server in a periodic assistance session. For example, the location server starts an unsolicited periodic assistance session, and transmits information indicating the unsolicited assistance session is periodic as well as any relevant session parameters to the target device. The location server may change session parameters "on the fly," and inform the target device of the modified session parameters. The target device may initiate a session and requests certain parameters, to which the location server responds with an indication as to what parameters the target device will actually receive. Additionally, the target device may modify the session parameters, and the location server can respond to the target indicating whether or not the modification was accepted or if the modification was accepted in a modified form.

20 Claims, 5 Drawing Sheets

Related U.S. Application Data

(60) Provisional application No. 61/323,289, filed on Apr. 12, 2010.

(51) Int. Cl.
  *H04W 4/20* (2018.01)
  *G01S 19/05* (2010.01)

(58) Field of Classification Search
  USPC ............................... 709/228, 219; 370/329
  See application file for complete search history.

(56) References Cited

U.S. PATENT DOCUMENTS

| | | |
|---|---|---|
| 2009/0319848 A1 | 12/2009 | Thaper |
| 2011/0249623 A1* | 10/2011 | Wachter ................. H04W 4/20 370/328 |

FOREIGN PATENT DOCUMENTS

| | | |
|---|---|---|
| WO | WO 2005/032197 A1 | 4/2005 |
| WO | WO 2008/113698 A2 | 9/2008 |
| WO | WO 2009/125055 A1 | 10/2009 |

OTHER PUBLICATIONS

International Search Report received for corresponding Patent Cooperation Treaty Application No. PCT/FI2011/050307, dated Aug. 15, 2011, 4 pages.
International Preliminary Report on Patentability received for corresponding Patent Cooperation Treaty Application No. PCT/FI2011/050307, dated Oct. 16, 2012, 7 pages.
Written Opinion received for corresponding Patent Cooperation Treaty Application No. PCT/FI2011/050307, dated Aug. 15, 2011, 6 pages.
Wirola L. "Studies on Location Technology Standards Evolution in Wireless Networks", Doctoral dissertation [online], Mar. 12, 2012, 255 pages. Retrieved from the internet <URL: http://dspace.cc.tut/fi/dpub/handle/123456789/6509> chapters 4.2, 7-4.2.8.
"$3^{rd}$ Generation Partnership Project; Technical Specification Group Radio Access Network; Evolved Universal Terrestrial Radio Access (E-UTRA); LTE Positioning Protocol (LLP) (Release 9)", 3GPP TS 36.355, V9.0.0, Dec. 2009, pp. 1-102.
"$3^{rd}$ Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 9)", 3GPP TS 36.305, V9.1.0, Dec. 2009, pp. 1-52.
Office action received for corresponding Chinese Patent Application No. 201180018517.8, dated Sep. 15, 2014, 4 pages of office action and No pages of English translation Available.
Supplementary European Search Report and Written Opinion received for corresponding European Application No. 11768506, dated Aug. 14, 2013, 7 pages.
Lauri Wirola et al. "Supl3 Rd-Assistance data push; OMA-LOC-2009-0173R02-CR_SUPL3_RD_AssistanceData", OMA-LOC-2009-0173R02- CR_Supl3_Rd_Assistancedatapush, Open Mobile Alliance (OMA), 4330 La Jolla Village Dr., Suite 110 San Diego, CA 92122, USA, Jun. 15, 2009, pp. 1-3, retrieved from Internet: URL: ftp/Public_documents/LOC/2009/.
Lauri Wirola et al. "Supl3 Rd-Streaming 1-20; OMA-LOC-2009-0178R02-CR_SUPL3_RD_Strea", OMA-LOC-2009-0178R02-CR_Supl3_RD_Streaming, Open Mobile Alliance (OMA), 4330 La Jolla Village Dr., Suite 110 San Diego, CA 92122, USA, Jun. 15, 209, pp. 1-4, retrieved from the Internet: URL: ftp/Public_documents/LOC/2009/.
$3^{rd}$ Generation Partnership Project; Technical Specification Group Radio Access Network; Evolved Universal Terrestrial Radio Access (E-Utra); LTW Positioning Protocol (LPP)(Release 9), 3GPP Draft; R2-096252, $3^{rd}$ Generation Partnership Project (3GPP), Mobile Competence centre; 650 Route Des Lucioles; F-06921 Sophia-Antipolis Cedex; France, no. Miyazaki; Oct. 12, 2009, Oct. 1, 2009.
Office Action received for corresponding Chinese Application No. 201180018517.8, dated Sep. 30, 2013, 18 pages.
Office Action received for corresponding Chinese Application No. 201180018517.8, dated Apr. 11, 2014, 15 pages.
Office action received for corresponding Canadian Patent Application No. 2795859, dated Oct. 14, 2014, 3 pages.
Office action received for corresponding European Patent Application No. 11768506.5, dated May 26, 2014, 5 pages.
Office action received for corresponding Kenya Patent Application No. AP/P/12/006503, dated Mar. 12, 2015, 5 pages.
Office Action for corresponding Canadian Application No. 2,75,859 dated Jul. 8, 2015.
Office Action for Canadian Application No. 2,795,859 dated May 2, 2016.
Decision to Grant European Application No. 11768506.5 dated Dec. 3, 2015.
European Search Report for Application No. EP 15 20 2774 dated May 11, 2016.
Office Action for U.S. Appl. No. 13/640,138 dated Jun. 11, 2015.
Office Action for U.S. Appl. No. 13/640,138 dated Oct. 22, 2015.
Notice of Allowance for U.S. Appl. No. 13/640,138 dated Jul. 20, 2016.
Office action received for corresponding European Patent Application No. 15202774.4, dated May 2, 2017, 7 pages.
Office Action from corresponding European Patent Application No. 15202774.4 dated Feb. 5, 2018, 5 pages.

\* cited by examiner

SESSION PARAMETERS IN THE PERIODIC ASSISTANCE DATA DELIVERY

CROSS-REFERENCE TO RELATED APPLICATIONS

This application is a continuation of U.S. patent application Ser. No. 13/640,138, filed May 7, 2013, which is a national stage entry of Patent Cooperation Treaty Application No. PCT/IF2011/050307, filed on Apr. 11, 2011, which claims the benefit of U.S. Provisional Patent Application No. 61/323,289, filed Apr. 12, 2010. The entire contents of each of these applications are incorporated by reference herein for all purposes.

FIELD

Various embodiments relate generally to positioning technologies for location-based services. More particularly, various embodiments relate to providing session parameters and/or information regarding session parameters in the context of periodic assistance data delivery.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims provided herein and is not admitted to be prior art by inclusion in this section.

Location services can refer to those services which are based upon the location of a mobile device. Conventional location services (LCS) architectures can be divided into two categories, i.e., control plane architecture and user plane architecture, according to the type of communications engaged in between relevant elements. In a control plane architecture, location determination can be done according to 3.sup.rd Generation Partnership Project (3GPP) standards using embedded signaling protocols. In addition, 3GPP standards can also involve the use of a base station subsystem (BSS)-centric architecture. Other methods of location determination are based on a network subsystem (NSS)-centric architecture, although more recent 3GPP standards releases, e.g., re14, no longer employ the NSS-centric solution. Alternatively, a user plane architecture can be characterized as an overlay solution. In other words, a data connection on a user plane between a relevant server and a terminal, e.g., user equipment (UE), is used to transfer radio interface information, satellite information, and/or other information needed to determine location.

Furthermore, the 3GPP is moving towards the 4.sup.th generation of radio technologies, with the advent of Long Term Evolution (LTE) technology/standardization. Location-based technology in the context of LTE includes an LTE positioning protocol (LPP) described in the LPP specification "3GPP TS 36.355 Stage 3" which can be found on the 3GPP website. LPP, architecturally-speaking, is used "point-to-point" between a target (e.g., a UE to be positioned) and a server (e.g., a location server providing, for example, positioning instructions and assistance), in order to position the target using position-related measurements obtained by one or more reference sources. In user plane deployments, LPP is encapsulated as a sub-protocol to the UserPlane Location Protocol (ULP), i.e., ULP is the carrier protocol for LPP. ULP is defined in Open Mobile Alliance Secure User Plane Location Protocol (OMA SUPL). Release 2.0 and the later releases of SUPL support the encapsulation of LPP.

In a relative positioning method, one device is positioned with respect to another device. The purpose is to determine the relative position (baseline) between the two devices accurately, not necessarily the absolute position of the devices. Relative positioning can be performed between two terminals or between a terminal and a reference station. Moreover, a multi-baseline solution may be implemented with the baselines being solved between multiple devices.

A simple form of relative positioning involves the difference in positions of two devices. However and oftentimes, relative positioning refers to higher-accuracy methods including, e.g., a satellite navigation technique referred to as Real-Time Kinematic (RTK), that generally achieves sub-decimeter (sub-dm) accuracies. RTK navigation is reliant upon obtaining continuous periodic carrier and code phase measurements from two Global Navigation Satellite System (GNSS) receivers, which can be terminals and/or virtual/physical reference receivers. These measurements are linearly combined in a manner such that common mode errors negate/cancel each other out. For example, when the baseline is short, atmospheric errors (e.g., reduced group speed of propagation through the troposphere and ionosphere) are canceled out. For professional applications, dual-frequency global positioning systems (GPS) receivers are often used. Having a dual-frequency capability allows for, e.g., compensating for residual ionosphere errors. In the event that a baseline is short and the common mode errors are assumed to cancel out, single-frequency receivers can be used. Hence, the shorter the baseline is, the more straightforward and easier it becomes to accurately solve the baseline. It should be noted that RTK requires continuous periodic measurements (code and/or carrier phase) from the receivers.

Assistance data for assisted navigation systems, such as a GNSS, have been specified and standardized for cellular systems, e.g., GPS, European Galileo, and Russian Global Navigation Satellite System (GLONASS). An exemplary GNSS can comprise a network of satellites that broadcasts navigation signals including time and ranging data. GNSS receivers pick up these broadcasted navigation signals and calculate a precise global location based thereon. Other examples of GNSS include, but are not limited to, satellite-based augmentation systems (SBAS), local area augmentation systems (LAAS), quasi-zenith satellite systems (QZSS), and hybrid receivers.

The delivery of such assistance data can be built on top of cellular system-specific control plane protocols including, e.g., the radio resource location services protocol (RRLP) for GSM networks, the radio resource control (RRC) protocol of layer 3 in wideband code division multiple access (WCDMA) networks, and IS-801 for Code Division Multiple Access (CDMA) networks, standardized in the 3.sub.rd Generation Partnership Project (3GPP) and 3GPP2 standards.

Periodic assistance is not currently defined in any standard(s), but may be implemented, for example, in the context of RTK, because as indicated above, RTK requires a continuous periodic stream of reference measurement assistance. It should be noted that periodic assistance may be utilized in other contexts as well. A periodic assistance session is characterized by at least two session parameters: frequency (e.g., how often an assistance payload is delivered); and duration (e.g., how long the periodic assistance session lasts/will last). Moreover, a request for assistance should include information regarding the type of data that a requestor wishes to receive.

Further still and regarding periodic assistance in general, yet another session parameter may comprise the continuity of the periodic assistance, as there is a subtle difference between periodic assistance and continuous periodic assistance. For example, a device may request periodic assistance data to be delivered every ten minutes for a local troposphere model. In this instance, the server periodically provides the local troposphere model to the target for atmosphere error correction. However, although the delivery was initiated by the same request, the assistance data deliveries are independent in the sense that each of the deliveries can be used on its own, i.e. the model obtained at the time $t_{k}+10$ min replaces the model obtained at $t_{k}$.

In contrast, RTK, for example, requires continuous periodic assistance data. That is, the assistance data deliveries at $t_{k}$ and $._{tk+1}$ are not independent. Rather, the time series matters. Thus the additional session parameter to be considered could be an indication, if the session is, in addition to being periodic, also a continuous one with respect to the data in the assistance delivery. It should be noted however, that all the periodic sessions are continuous in the sense that, e.g., all the assistance data deliveries belong to the same assistance data session or transaction.

In the context of LPP, assistance data is requested using a "LPP Request Assistance Data" (target.fwdarw.server) message, where the assistance data is delivered in a "LPP Provide Assistance Data" (server.fwdarw.target) message. Although the LPP specification (described in "3GPP TS 36.355 Stage 3 Functional Specification of UE positioning in E-UTRAN" found on the 3GPP website) allows for multiple and successive "Provide" messages, a requester is still not able to request (continuous) periodic assistance.

In addition to a typical "Request-Provide" interaction, LPP also allows for the unsolicited provision of assistance data. That is, a server may push assistance data to the target, without the target first requesting it. This is useful when, for instance, the server "knows" that the target will eventually request certain assistance data. An example of such a scenario occurs in a UE-based, GNSS-based session, in which the server can be sure that after commanding such a positioning method, the target will send a request for ephemerides. The server may act pro-actively and push the assistance data to the target without an explicit request from the target requesting such assistance data.

However, providing "unsolicited" periodic assistance data is problematic in the case of a periodic session, because the target is unaware that the session that has been started is a periodic one. Moreover, the target does not know how long the session will last, or at what frequency it will receive data. Moreover and as discussed above, in some cases, the target might be unaware of whether the periodic session contains continuous data or not. It is acknowledged, however, that in the majority of the cases, the target can deduce, based on the data type, whether the session is meant to be a periodic one or a continuous periodic one.

Furthermore and during a target-server interaction, the server ultimately decides what the session parameters are. Hence, even though a target may request certain frequency and duration of data, the actual session parameters accepted by the server may be parameters that are different from that which the target originally requested. Therefore and in this situation, the server may provide periodic assistance data with session parameters that are unknown to the target. Further still and in the event that the server changes session parameters (due to resource constraints, for example) during the session, the target is unaware of these changes to the session parameters. Ultimately, in case the server starts a periodic session unsolicited, the target does not know about the session parameters, or in a worst-case scenario, the target is completely unaware that the assistance session is a periodic one and that more data will follow after the first delivery. If the target requests changes in the session parameters, the server may or may not accept the modification, and the target will not know whether or not the changes were accepted by the server. Moreover, yet another case may arise where the server accepts the modified session parameters in a partly modified manner. For example, if the session has session parameters, e.g., "duration=A" and "frequency=B" and the target requests the session to be modified so that the duration parameter is now "duration=C" and the frequency parameter is now "frequency=D," the server may "partly" accept the modification such that after the modification, the session parameters would result in "duration=C" and "frequency=B".

SUMMARY OF VARIOUS EMBODIMENTS

Various embodiments are directed to providing session parameters and/or information regarding session parameters in a periodic assistance session. New and/or modified session parameters, such as frequency and/or duration information, may be signaled to a target device from a location server. In a first scenario, the location server starts an unsolicited periodic assistance session, and transmits information indicating the unsolicited assistance session is periodic, as well as any relevant session parameters to the target device. A second scenario involves the location server changing session parameters "on the fly," and informing the target device of the modified session parameters. In a third scenario, the target device initiates a session and requests certain parameters, to which the location server responds with an indication as to what parameters the target device will actually receive. A fourth scenario may involve the modification of one or more session parameters by the target device, where the location server can respond to the target device indicating whether or not the modification was accepted (or if the modification was accepted in a modified form).

In accordance with various embodiments, and in support of the aforementioned scenarios, session parameters to be associated with a periodic assistance data delivery session are determined. The periodic assistance data delivery session to provide periodic assistance data to a device (e.g., target) is initiated. The determined session parameters are indicated to the device. For example, the session parameters may be indicated in a first message of the periodic assistance data delivery session. Thus, a target device may always be aware of session parameters during an assistance data delivery session. Moreover, it should be noted that in accordance with certain embodiments, any subsequent session parameter delivery/inclusion within the same session overrides any "old" parameters.

These and other advantages and features of various embodiments, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

Various embodiments are described by referring to the attached drawings, in which.

DETAILED DESCRIPTION OF VARIOUS EMBODIMENTS

Figure 1:
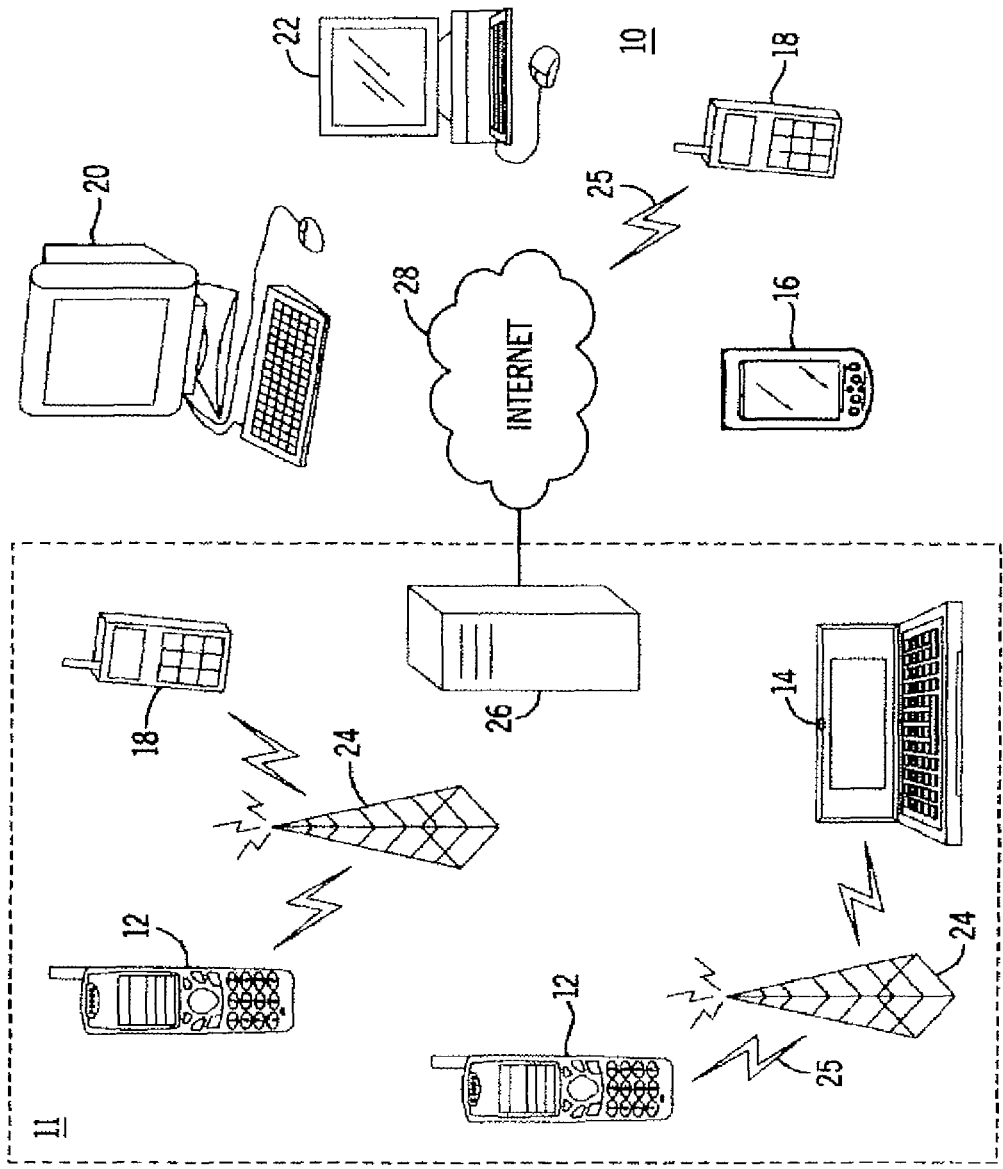
FIG. 1 is an overview diagram of a system within which various embodiments may be implemented.

FIG. 1 shows a system 10 in which various embodiments can be utilized, comprising multiple communication devices that can communicate through one or more networks. The system 10 may comprise any combination of wired or wireless networks including, but not limited to, a mobile telephone network (e.g., Global System for Mobile Communications (GSM), Wideband Code Division Multiple Access (W-CDMA), Code Division Multiple Access (CDMA), Long Term Evolution (LTE), Ultra Mobile Broadband (UMB), High Rate Packet Data (HRPD), and Worldwide Interoperability for Microwave Access (WiMax)), a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 1 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a electronic device 12, a combination personal digital assistant (PDA) and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, CDMA, GSM, Universal Mobile Telecommunications System (UMTS), Time Division Multiple Access (TDMA), Frequency Division Multiple Access (FDMA), WiMax, Transmission Control Protocol/Internet Protocol (TCP/IP), Short Messaging Service (SMS), Multimedia Messaging Service (MIMS), e-mail, Instant Messaging Service (IMS), Bluetooth, IEEE 802.11, etc. A communication device involved in implementing various embodiments of the present invention may communicate using various media including, but not limited to, radio, infrared, laser, cable connection, and the like.

Figure 2:
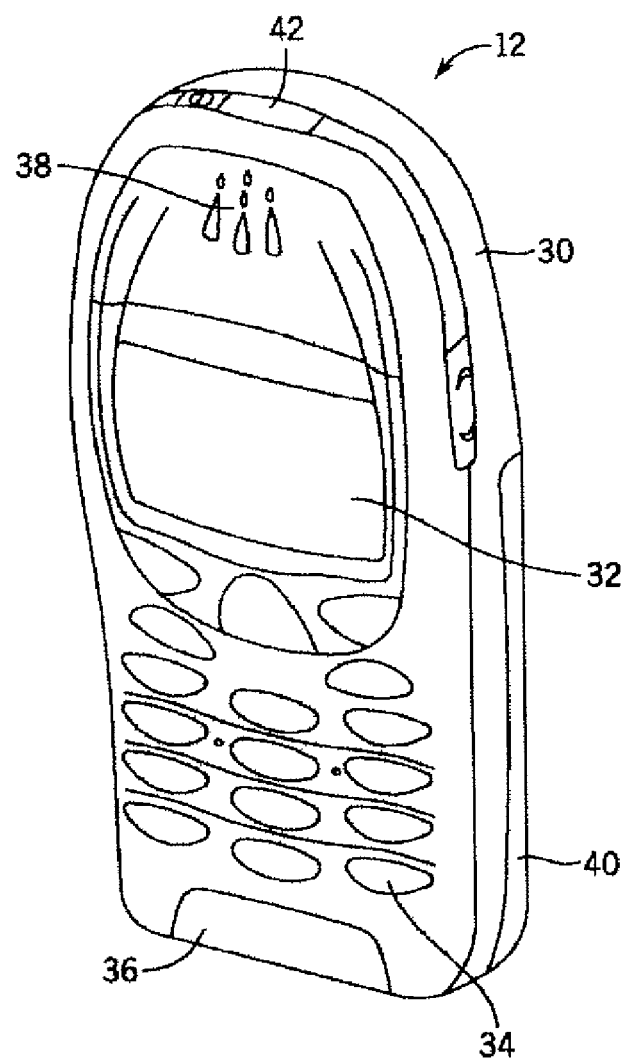
FIG. 2 is a perspective view of an electronic device that can be used in conjunction with the implementation of various embodiments.
Figure 3:
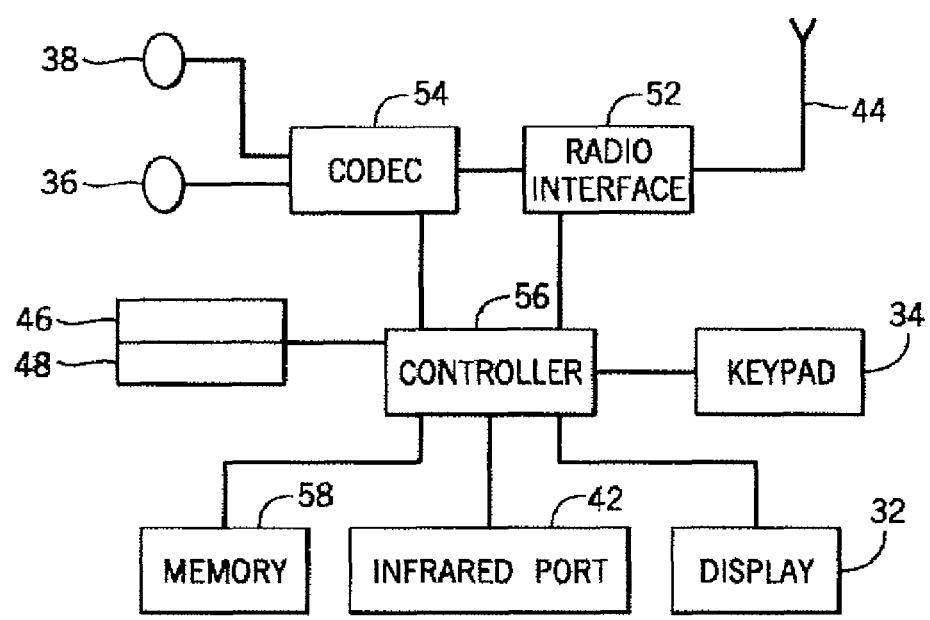
FIG. 3 is a schematic representation of the circuitry which may be included in the electronic device of FIG. 2.

FIGS. 2 and 3 show one representative electronic device 12 within which various embodiments may be implemented and/or used in conjunction with the implementation of various embodiments. It should be understood, however, that the various embodiments are not necessarily intended to be limited to one particular type of device. The electronic device 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. Individual circuits and elements are all of a type well known in the art.

Figure 4:
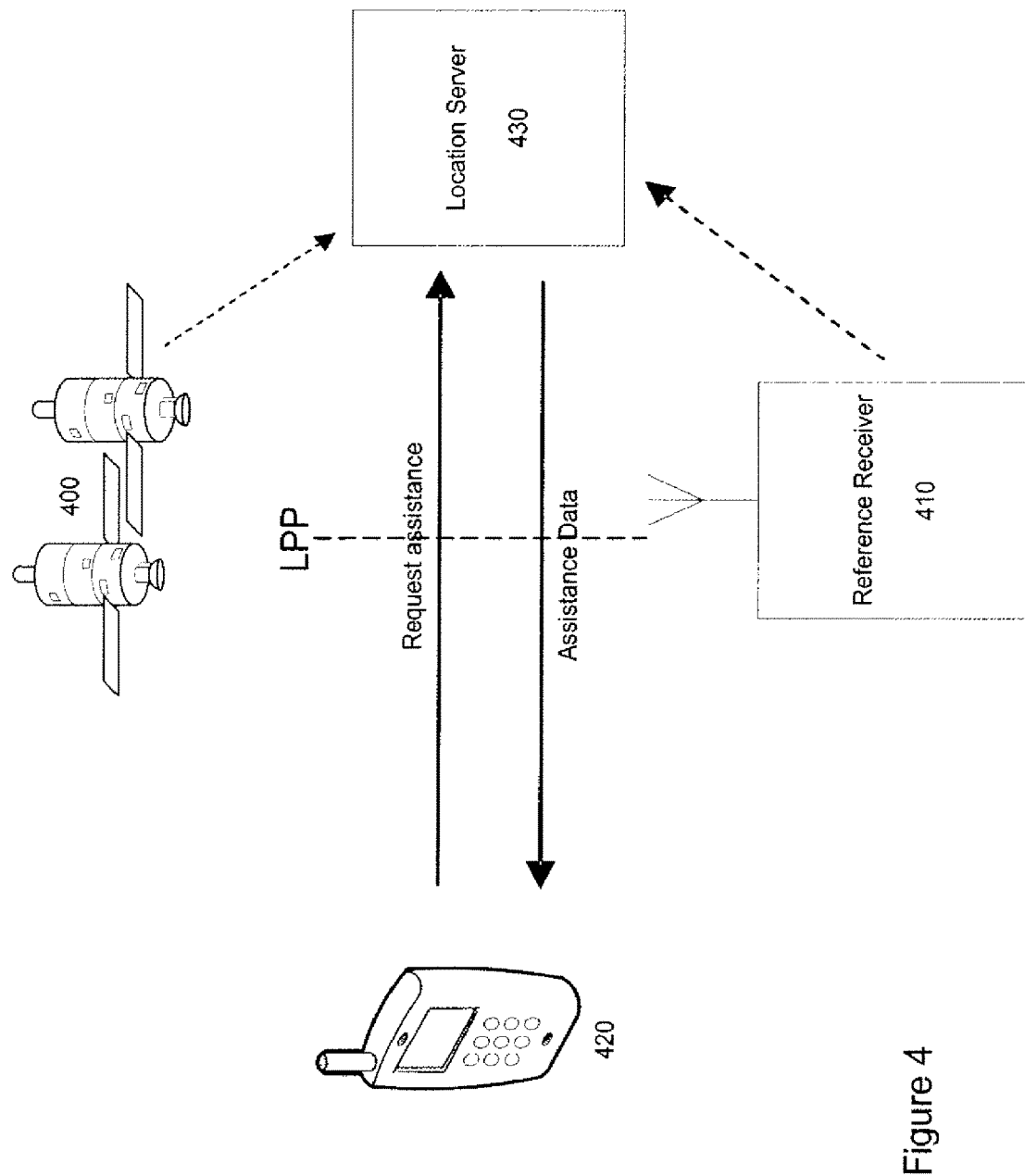
FIG. 4 illustrates an exemplary LPP aspect of the system 10 of FIG. 1.

FIG. 4 illustrates an LPP aspect of the system 10 of FIG. 1, including reference sources 400 and 410 (e.g., GNSS reference stations, virtual reference receivers, respectively), a target 420 (e.g., an electronic device), and a location server 430. The target 420 requests assistance from the location server 430. The location server 430 receives data from one or more of the reference sources 400/410. The location server 430 then provides the data (received from the reference resources) to the target 420 via an LPP session between the target 420 and the location server 430. It should also be noted that, e.g., the virtual reference receiver service that provides the virtual reference receivers may also receive information from the GNSS network (comprised at least in part of the GNSS reference stations) so that the virtual reference receiver service may compute the virtual reference receivers.

Various embodiments provide session parameters and/or information regarding session parameters in a periodic assistance session. For example, new and/or changed session parameters, such as frequency and/or duration, may be signaled to a target. Scenarios where such signaling may occur include a first scenario when the server starts an unsolicited periodic assistance session. In such a scenario, the target needs to know that this is a periodic session as well as any relevant parameters. A second scenario involves the server changing session parameters "on the fly", e.g., within a periodic assistance session. Within the periodic assistance session, any information regarding the session parameters overrides previous information. A third scenario may involve the target initiating a session and requesting certain parameters. In this scenario, the server can indicate to the target what parameters the target will actually receive, e.g., the target requests certain parameters and the server responds with those request parameters or different parameters that the server, itself, decides to send. A fourth scenario may involve the modification of one or more session parameters by the target. Thus, the server can respond to the target indicating whether or not the modifications were accepted or if the modifications were accepted in a further-modified form. In this scenario again, the server may, on its own, decide whether the originally requested session parameters or other session parameters are returned to the target. The server may make the choice based on, e.g., the current or projected server load so that the server can guarantee some level of service to all the service subscribers.

Figure 5:
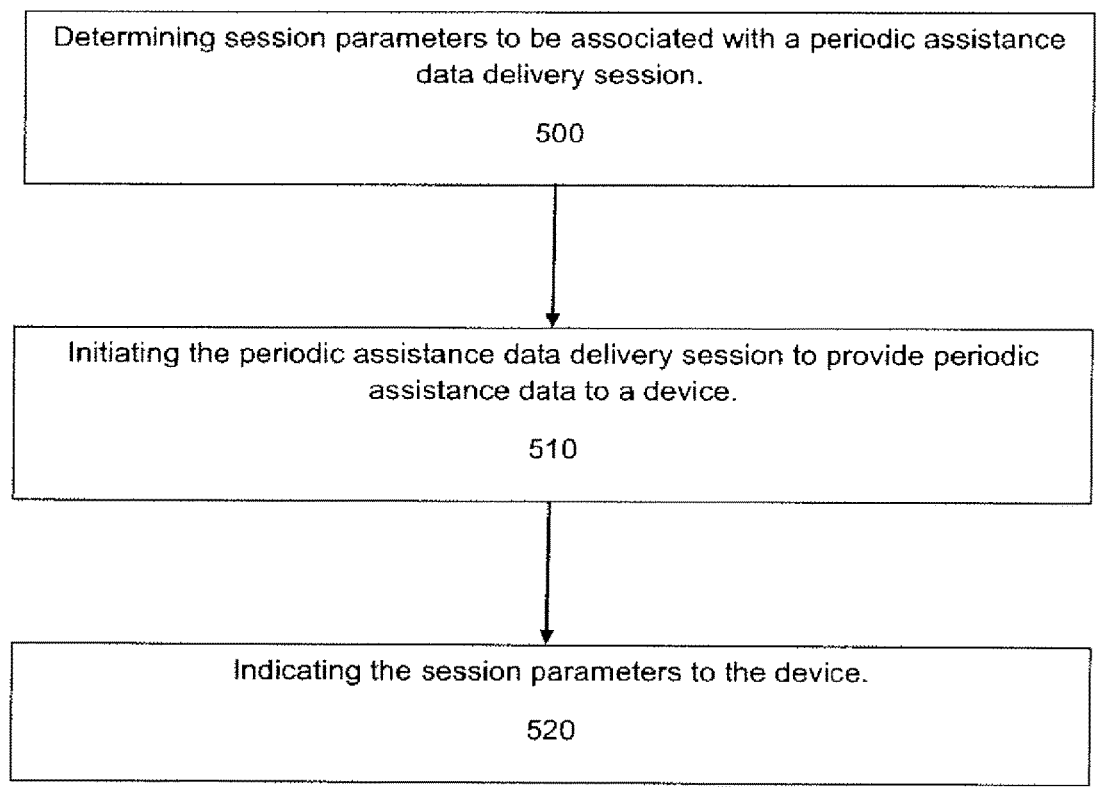
FIG. 5 illustrates an exemplary flow chart of processes for making a target aware of relevant session parameters/information regarding the relevant session parameters in accordance with various embodiments.

FIG. 5 illustrates an exemplary flow chart of processes for making a target aware of relevant session parameters/information regarding the relevant session parameters. For example, and as described above, a target may request periodic assistance for positioning purposes, e.g., positioning relative to another device, high-accuracy location of the target, etc. That is, an application implemented within the target may request, e.g., high-accuracy location information. Thus the target requests continuous periodic high-accuracy GNSS reference measurement assistance so that the target may determine its location at a high-accuracy level. The request may include information regarding data type information, requested GNSSs/signals, duration, and frequency. The server (e.g., location server) to which the request is sent, receives the request and analyzes the request to determine whether it can fulfill the request, and if so, with what session parameters. Thus, at 500, session parameters to be associated with a periodic assistance data delivery session (e.g., continuous periodic assistance) is determined at, e.g., the server. Once the determination is made to fulfill the request, and once the session parameters have been determined, at 510, the periodic assistance data delivery session is initiated to provide the periodic assistance data to a device (e.g., target). During the periodic assistance data delivery session, at 520, the determined session parameters are indicated/sent to the device. For example, the session parameters may be indicated in a first message (e.g., a Provide message as described above) of the periodic assistance data delivery session. Thus, the target may start receiving the periodic assistance it requests and can begin determining its location at a high accuracy. At some point, the target can determine its location at a high accuracy (due to the periodic assistance data it received) and the target can either continue receiving the periodic assistance data until the end of the continuous periodic assistance data delivery session, or terminate the continuous periodic assistance data delivery session. Continuing to receive the periodic assistance data may be useful, e.g., in order to update the target's location instead of merely calculating a single position. In this instance, the server may provide the target with periodic assistance data until the continuous periodic assistance data delivery session expires, where the target is able to track its position/location until the end of the continuous periodic assistance data delivery session.

It should be noted that when a session is about to expire, the target may decide that it wishes to continue the session and sends a modification request. The strength of the session parameters in the return/respond/provide message thus becomes apparent, because in the event that there are no new session parameters involved, the target may simply deduce that the server didn't accept the modification request. Furthermore and for notification purposes, the server may also indicate a "new" duration that may be represented as, e.g., "DURATION NEW=" and the "old" duration as, e.g., "DURATION_OLD-TIME ELAPSED." It should be noted that in this scenario, the total length of a session may remain unchanged, but utilizing the above information elements, the server can indicate to the target that a modification request was received, and that the session parameters were modified per the target's request. Again, however, in actuality, the session length is unchanged. Another type of indication that may be utilized may be a simple indication, e.g., a BOOLEAN flag in the Provide message to indicate that a modification request was received, but that there are no changes to the session. Alternatively still and if the modification was in fact, accepted, the new session parameters are made known to the target as described in accordance with various embodiments.

The following Abstract Syntax Notation One (ASN.1) code illustrates an exemplary implementation of various embodiments.

TABLE-US-00001 Request::=SEQUENCE {transactionID TransactionID, PeriodicRequestIE PeriodicRequestIE,} PeriodicRequestIE::=SEQUENCE {periodicRequest PeriodicRequest OPTIONAL, periodicModify PeriodicModify OPTIONAL,} PeriodicRequest:: =SEQUENCE{sessionParameters SessionParameters, assistanceDataDetails AssistanceDataDetails, --Carries information on data types requested} PeriodicModify:: =SEQUENCE {sessionParameters SessionParameters, transactionIdOfTransactionToBeModified TransactionID, periodicSessionIdToBeModified PerSessionId,} Provide:: =SEQUENCE {transactionID TransactionID, periodicProvide PeriodicProvide,} PeriodicProvide::=SEQUENCE {sessionParameters SessionParameters OPTIONAL, continuationOfPreviousTransaction TransactionID OPTIONAL, assistanceData AssistanceData, --Carries the actual assistance data periodicSessionId PerSessionId,} SessionParameters::=SEQUENCE {frequency Frequency, duration Duration,} Duration::=ENUMERATED{10_s, 30_s, 60_s, 120_s, 300_s, 600_s, Infinite} Frequency:: =ENUMERATED{0.01 Hz, 0.1 Hz, 1 Hz, 2 Hz, MaxRate} TransactionID::=INTEGER(0 . . . 255) PerSessionId::=INTEGER(0 . . . 255)

It should be noted that the above ASN.1 code illustrates an exemplary notation that describes the data structure for, e.g., representing, encoding/decoding, and transmitting data in accordance with various embodiments. It should be further understood that the exemplary ASN.1 code presented above may define messages for use in an appropriate communication protocol, resulting in binary encoding, via the use of any number of, e.g., ASN.1 encoding rules.

In the first scenario described above, where the server starts an unsolicited periodic assistance session (e.g., the server begins pushing Provide messages containing a PeriodicProvide information element as described above), the PeriodicProvide information element includes the session parameters (frequency, duration). Hence, the target will become aware of the relevant session parameters. In this particular scenario, the parameters may only need to be provided in a first message unless they are modified, in which case, the session parameters are provided to the target again. A TransactionID information element binds the stream of Provide messages together, and indicates that they belong to the same stream of assistance data.

In the second scenario, where the server changes session parameters on the fly, the server simply provides new session parameters defined using/in the SessionParameters information element in the PeriodicProvide information element. Due to the TransactionID information element included in the Provide message, the target knows which periodic assistance data stream is being/has been modified.

In the third scenario described above, where the target initiates a periodic assistance session, the target indicates to the server what session parameters are desired. This is accomplished via, e.g., the PeriodicRequestIE information element, which may be included in a Request message sent by the target to the server. The PeriodicRequest IE information element may contain the requested session parameters, and the types of data requests. The server begins providing periodic assistance to the target, where in the first Provide message, the server indicates to the target, what/which actual session parameters are being provided in the PeriodicProvide information element of the Provide message.

In accordance with the fourth scenario described above, the target may modify session parameters of a periodic assistance session by sending a PeriodicModify information element within the PeriodicRequestIE information element. The PeriodicModify information element includes the new session parameters the target would like to have. The PeriodicModify information element may also include the TransactionID of the assistance transaction in the transactionIdOfTransactionToBeModified information element so that the server can link/associate the modification request to the appropriate periodic assistance delivery session. The TransactionID is transmitted in this instance because the request message for modifying the periodic session is a new transaction. Hence, in the modify request, the transaction to which the modify command is directed needs to be identified. It should also be noted that the modify may concern the GNSSs (reference resources)/signals in the assistance.

Thereafter, the server may begin providing periodic assistance data to the target in this new transaction. In the first PeriodicProvide information element (in addition to the new session parameters), the server also indicates to the target that this assistance data is a continuation of some on-going transaction (through the use of the continuationOfPreviousTransaction information element). It should be noted that the continuationOfPreviousTransaction notification is not strictly necessary, but may be utilized in accordance with various embodiments to assist the target in its operations.

Further still, and after the server starts to provide periodic assistance data to the target in a new transaction, the server (or target) may abort the old transaction. In the event that the server is unable to launch a new transaction with modified session parameters, the server might send an abort/error indication to the modify request and continue providing data in the already on-going transaction. It should be noted that in the above example, the Request and Provide messages merely contain a TransactionID and the periodic data request/provide. However, this description has been simplified for ease of explanation of the implementation of various embodiments, and to show a "general" implementation. That is, messages defined in a "true" LPP data structure would include many more elements. It should also be noted that in a true LPP data structure (per the LPP specification version 9.0.0), the TransactionID element actually consists of two parameters, an initiator of the transaction (whether it be the server or the target), and a TransactionNumber having values within a range [0,255]. In the description provided herein, the TransactionID element has been reduced to merely the TransactionNumber, again for simplicity in describing various embodiments.

Further with regard to LPP, it should be noted that LPP messaging is based on transactions within an LPP session, where the LPP session is used to support a single location request and consists of transactions that each perform a single activity. For example and in the case of UE-initiated assistance data delivery, an LPP transaction consists of a "LPP Request Assistance Data" (target.fwdarw.server) message and one or more "LPP Provide Assistance Data" (server.fwdarw.target) messages. Thus, assuming that the server is providing the target with periodic assistance data in a transaction having, e.g., a TransactionID=1, the modified periodic assistance data session will have a new transaction TransactionID=2, because the new LPP Request Assistance Data with a PeriodicModify information element is required to be sent from the target to the server. This automatically means a new transaction within the LPP session.

The previously described examples have been in the context of an understanding of how LPP currently operates, i.e., that a new request (containing a modify element) would launch another transaction within the LPP session. However, future implementations of LPP could be altered such that several request messages (including assistance data requests) can be included in one transaction. Various embodiments described herein would still be applicable even to future versions of LPP, with certain adaptations. For example, when modifying a periodic assistance session (in anticipation of LPP allowing several request messages to be included in a single transaction) there would not necessarily be a need to launch another transaction. Hence, the above-described information elements, e.g., transactionIdOfTransactionToBeModified and continuationOfPreviousTransaction, would not be needed. In such a scenario, the flow control of the periodic assistance data delivery is completely based on the TransactionID value included within, e.g., Provide/Request message header.

Yet another possible implementation of various embodiments involves giving periodic assistance delivery sessions their own IDs, independent of transactions IDs (and of high-level LPP session IDs). As such, the modify commands and other signaling would be based on a periodic assistance delivery session ID. Each request to modify such a session would result in a new transaction as described above. Thus, the transactionIdOfTransactionToBeModified information element would be changed to a "periodicSesssionIdToBeModified" information element. The continuationOfPreviousTransaction information element would become obsolete in this particular implementation. Moreover, a Provide message would simply have an ID associated with a particular periodic assistance delivery session. In this case, the TransactionID element is irrelevant for the purposes of identifying periodic assistance data delivery sessions in accordance with various embodiments described herein, although the TransactionID would still be utilized for, e.g., the LPP stack handling LPP sessions, transactions, etc. Moreover, the periodic assistance data delivery flow control is based on the periodic assistance delivery IDs.

To summarize, periodic assistance data delivery flow control based on multiple transactions involves including a TransactionID within one or more of a transactionIdOfTransactionToBeModified information element and a continuationOfPreviousTransaction information element. If periodic assistance data delivery flow control is based on periodic session ID, the PerSessionId would be included in PeriodicProvide and periodicSesssionIdToBeModified information elements. If periodic assistance data delivery flow control happens to be based on a single transaction, then none of the aforementioned information elements (i.e., transactionIdOfTransactionToBeModified, continuationOfPreviousTransaction, or periodicSesssionIdToBeModified), nor a PerSessionId is utilized, because all the messaging takes place in a single transaction and thus the messages can be linked together with, e.g., the transaction ID. It should also be noted that even though the modification of a session has been described herein as being provided by using an information element within a request message, the modification could also be performed using a dedicated message, such as LPP Modify Assistance Data, of which content might exemplary follow that of PeriodicModify in the ASN.1 code described above.

Moreover, it should be noted that various embodiments described herein can be applied to other data as well. That is, although the description provided herein is in the context of an assistance data request/provide mechanism, and because LPP already supports a periodic measurement request/provide mechanism, various embodiments can be adapted for the request/provide of measurement data as well. Additionally, it should be noted that, as opposed to assistance data delivery, where, e.g., a target may request assistance data and a server provides such data, in the case of measurement data delivery, a server may request data and the target may provide the requested data. Further still, it should be noted that the session parameters/session parameters modification mechanism in accordance with various embodiments can be adapted and also provided to periodic measurement sessions.

The various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Additionally, the various embodiments may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

Individual and specific structures described in the foregoing examples should be understood as constituting representative structure of means for performing specific functions described in the following the claims, although limitations in the claims should not be interpreted as constituting "means plus function" limitations in the event that the term "means" is not used therein. Additionally, the use of the term "step" in the foregoing description should not be used to construe any specific limitation in the claims as constituting a "step plus function" limitation. To the extent that individual references, including issued patents, patent applications, and non-patent publications, are described or otherwise mentioned herein, such references are not intended and should not be interpreted as limiting the scope of the following claims.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

A method comprising determining session parameters to be associated with a periodic assistance data delivery session; and initiating the periodic assistance date delivery session to provide periodic assistance data to a device.

The method, wherein the initiation of the periodic assistance data delivery session originates from a location server, and wherein the initiation of the periodic assistance data delivery session is unsolicited.

The method, wherein a first message of the periodic assistance data delivery session is utilized to indicate the determined session parameters to the device, and wherein the first message further includes an indication that the periodic assistance data delivery session comprises a periodic session.

The method, wherein the unsolicited periodic assistance data delivery session is effectuated by the transmission of Provide messages, the Provide messages including a transaction ID that binds the Provide messages and is indicative that the Provide messages belong to a single assistance data stream in which the periodic assistance data delivery session is effectuated.

The method, wherein the session parameters are modified by a location server during the periodic assistance data delivery session, the modified session parameters being indicated to the device, and the modified session parameters overriding the session parameters transmitted to the device via a previous message with session parameters.

The method, wherein the first message comprises a Provide message, the Provide message containing a first information element in which the modified session parameters are transmitted, and a transaction ID that identifies an assistance data stream affected by the modified session parameters.

The method, wherein the initiation of the periodic assistance data delivery session originates from the device pursuant to a request for periodic assistance data according to requested session parameters.

The method further comprising, providing the session parameters requested by the device from a location server, wherein the session parameters comprise either the session parameters requested by the device or different session parameters based upon a decision made by the location server.

The method, wherein the request for the session parameters is effectuated via a first information element contained in a Request message, and further wherein either the session parameters requested by the device or the different session parameters are transmitted to the device via a second information element within a Provide message.

The method, wherein the session parameters are modified by the device during the periodic assistance data delivery session.

The method further comprising, reporting back to the device from a location server whether or not the modified session parameters were either accepted or accepted upon further modification.

The method, wherein the modification of the session parameters is requested via a first information element contained with a second information element, the second information element being contained within a Request message.

The method, wherein the first information element further contains a transaction ID linking the modification of the session parameters to an assistance data stream in which the periodic assistance data delivery session is effectuated.

The method, wherein a single transaction encompasses a plurality of modifications to the periodic assistance data delivery session.

The method further comprising, assigning an ID to the periodic assistance data delivery session, the assigned periodic assistance data delivery session ID linking modifications to the periodic assistance data delivery session to a particular assistance data stream.

The method, wherein the session parameters comprise frequency information regarding how often a payload of the assistance data is delivered, and duration information regarding how long a periodic assistance data delivery session will last.

The method, wherein the device comprises a mobile communication device.

A computer program product, embodied on a non-transitory computer-readable medium, comprising computer code including computer-executable instructions that cause a processor to perform the processes of the method.

An apparatus comprising a processor; and a memory unit communicatively connected to the processor, and including computer code configured to, operating with the processor, cause the apparatus to: determine session parameters to be associated with a periodic assistance data delivery session; and initiate the periodic assistance date delivery session to provide periodic assistance data to a device.

The apparatus, wherein the initiation of the periodic assistance data delivery session is unsolicited.

The apparatus, wherein a first message of the periodic assistance data delivery session is utilized to indicate the determined session parameters to the device, and wherein the first message further includes an indication that the periodic assistance data delivery session comprises a periodic session.

The apparatus, wherein the unsolicited periodic assistance data delivery session is effectuated by the transmission of Provide messages, the Provide messages including a transaction ID that binds the Provide messages and is indicative that the Provide messages belong to a single assistance data stream in which the periodic assistance data delivery session is effectuated.

The apparatus, wherein the computer code further causes the processor to modify the session parameters during the periodic assistance data delivery session, indicate the modified session parameters to the device, the modified session parameters overriding the session parameters transmitted to the device via a previous message with session parameters.

The apparatus, wherein the first message comprises a Provide message, the Provide message containing a first information element in which the modified session parameters are transmitted, and a transaction ID that identifies an assistance data stream affected by the modified session parameters.

The apparatus, wherein the initiation of the periodic assistance data delivery session originates from the device pursuant to a request for periodic assistance data according to requested session parameters.

The apparatus, wherein the computer code further causes the processor to provide the session parameters requested by the device, and wherein the session parameters comprise either the session parameters requested by the device or different session parameters based upon a decision made by the apparatus.

The apparatus, wherein the request for the session parameters is effectuated via a first information element contained in a Request message, and further wherein either the session parameters requested by the device or the different session parameters are transmitted to the device via a second information element within a Provide message.

The apparatus, wherein the session parameters are modified by the device during the periodic assistance data delivery session.

The apparatus, wherein the computer code further causes the processor to report back to the device whether or not the modified session parameters were either accepted or accepted upon further modification.

The apparatus, wherein the modification of the session parameters is requested via a first information element contained with a second information element, the second information element being contained within a Request message.

The apparatus, wherein the first information element further contains a transaction ID linking the modification of the session parameters to an assistance data stream in which the periodic assistance data delivery session is effectuated.

The apparatus, wherein a single transaction encompasses a plurality of modifications to the periodic assistance data delivery session.

The apparatus further comprising, assigning an ID to the periodic assistance data delivery session, the assigned periodic assistance data delivery session ID linking modifications to the periodic assistance data delivery session to a particular assistance data stream. The apparatus, wherein the apparatus comprises a location server. The apparatus, wherein the session parameters comprise frequency information regarding how often a payload of the assistance data is delivered, and duration information regarding how long a periodic assistance data delivery session will last.

A system comprising a target device; and a location server communicatively coupled with the target device, wherein the location server is configured to: determine session parameters to be associated with a periodic assistance data delivery session; and initiate the periodic assistance date delivery session to provide periodic assistance data to the target device.

The system, wherein the target device comprises a mobile communications device.

The system, wherein the session parameters comprise frequency information regarding how often a payload of the assistance data is delivered, and duration information regarding how long a periodic assistance data delivery session will last.

What is claimed is:

1. A method comprising:
   receiving, by a device, periodic assistance data associated with periodic assistance data delivery session;
   receiving, by the device, modified session parameters in a provide message of the periodic assistance data delivery session, the provide message comprising an information element in which the modified session parameters are received, and an identification that identifies an assistance data stream affected by the modified session parameters, wherein the session parameters comprise at least one of frequency information regarding how often a payload of the assistance data is delivered, and duration information regarding how long the periodic assistance data delivery session will last;

and wherein the modified session parameters override previous session parameters received by the device via a previous message with the previous session parameters;

continuing of the receiving, by the device, periodic assistance data of the periodic assistance data delivery session based on the modified session parameters.

2. The method of claim 1, wherein the initiation of the periodic assistance data delivery session originates from a location server, and wherein the initiation of the periodic assistance data delivery session is unsolicited.

3. The method of claim 1 further comprising:

receiving, by the device, a first message of the periodic assistance data delivery session from the location server, indicating the determined session parameters and an indication that the assistance data delivery session comprises a periodic session.

4. The method of claim 1, wherein the initiation of the periodic assistance data delivery session originates from the device pursuant to a request for periodic assistance data according to requested session parameters.

5. The method of claim 4 further comprising, requesting, by the device, the session parameters from a location server, wherein the session parameters comprise either the session parameters requested by the device or different session parameters based upon a decision made by the location server.

6. The method of claim 1, wherein the session parameters are modified by the device during the periodic assistance data delivery session.

7. The method of claim 6, wherein the modification of the session parameters is requested by the device via a request message, and wherein the request message further contains an identification linking the modification of the session parameters to an assistance data stream in which the periodic assistance data delivery session is effectuated.

8. The method of claim 7 further comprising, receiving, by the device, a reporting from the location server whether or not the modified session parameters were either accepted or accepted upon further modification.

9. The method of claim 1, wherein a single session encompasses a plurality of modifications to the periodic assistance data delivery session.

10. The method of claim 1, wherein the device comprises a mobile communication device.

11. An apparatus, comprising:

a processor; and a memory unit communicatively connected to the processor, and including computer code configured to, operating with the processor, cause the apparatus to:

receive, by a device, periodic assistance data associated with periodic assistance data delivery session;

receive, by the device, modified session parameters in a provide message of the periodic assistance data delivery session, the provide message comprising an information element in which the modified session parameters are received, and an identification that identifies an assistance data stream affected by the modified session parameters, wherein the session parameters comprise at least one of frequency information regarding how often a payload of the assistance data is delivered, and duration information regarding how long the periodic assistance data delivery session will last; and wherein the modified session parameters override previous session parameters received by the device via a previous message with the previous session parameters;

continue of the receiving, by the device, periodic assistance data of the periodic assistance data delivery session based on the modified session parameters.

12. The apparatus of claim 11, wherein the initiation of the periodic assistance data delivery session is unsolicited.

13. The apparatus of claim 11, wherein the initiation of the periodic assistance data delivery session originates from the device pursuant to a request for periodic assistance data according to requested session parameters.

14. The apparatus of claim 13, wherein the apparatus is configured to request the session parameters from a location server, and wherein the session parameters comprise either the session parameters requested by the device or different session parameters based upon a decision made by the server.

15. The apparatus of claim 11, wherein the session parameters are caused to be modified by the device during the periodic assistance data delivery session.

16. The apparatus of claim 15, wherein the apparatus is configured to receive a report from the server whether or not the modified session parameters were either accepted or accepted upon further modification.

17. The apparatus of claim 11, wherein the apparatus comprises a mobile device.

18. A computer program product, embodied on a non-transitory computer-readable medium, comprising computer code including computer-executable instructions that cause a processor to perform the processes of:

receiving, by a device, periodic assistance data associated with periodic assistance data delivery session;

receiving, by the device, modified session parameters in a provide message of the periodic assistance data delivery session, the provide message comprising an information element in which the modified session parameters are received, and an identification that identifies an assistance data stream affected by the modified session parameters, wherein the session parameters comprise at least one of frequency information regarding how often a payload of the assistance data is delivered, and duration information regarding how long the periodic assistance data delivery session will last; and wherein the modified session parameters override previous session parameters received by the device via a previous message with the previous session parameters;

continuing of the receiving, by the device, periodic assistance data of the periodic assistance data delivery session based on the modified session parameters.

19. The computer program product of claim 18, wherein the initiation of the periodic assistance data delivery session originates from the device pursuant to a request for periodic assistance data according to requested session parameters.

20. The computer program product of claim 18, wherein the session parameters are caused to be modified by the device during the periodic assistance data delivery session.

* * * * *